US005292583A

United States Patent [19]

Taki et al.

[11] Patent Number: 5,292,583

[45] Date of Patent: Mar. 8, 1994

[54] THERMAL TRANSFER RECORDING SHEET

[75] Inventors: Tsutomu Taki, Tokyo; Katsuhiko Kuroda, Yokohama, both of Japan

[73] Assignee: Mitsubishi Kasei Corporation, Tokyo, Japan

[21] Appl. No.: 910,445

[22] Filed: Jul. 8, 1992

[30] Foreign Application Priority Data

Jul. 8, 1991 [JP] Japan .................................. 3-167193

[51] Int. Cl.$^5$ ................................................ B32B 9/00

[52] U.S. Cl. .................................... 428/323; 428/195; 428/327; 428/328; 428/331; 428/488.4; 428/913; 428/914

[58] Field of Search ................ 503/227; 428/195, 480, 428/913, 914, 323, 409, 484, 488.4, 207, 423.1, 331, 327, 328

[56] References Cited

U.S. PATENT DOCUMENTS

| | | | |
|---|---|---|---|
| 4,829,050 | 5/1989 | Henzel et al. | 428/195 |
| 4,853,274 | 8/1989 | Makishima et al. | 428/195 |
| 4,925,735 | 5/1990 | Koshizuka et al. | 428/195 |
| 4,981,748 | 1/1991 | Kawai et al. | 428/195 |
| 5,026,606 | 6/1991 | Isbrandt et al. | 428/421 |
| 5,143,782 | 9/1992 | Morishima et al. | 428/195 |

FOREIGN PATENT DOCUMENTS

| | | |
|---|---|---|
| 0138483 | 4/1985 | European Pat. Off. . |
| 0411642 | 2/1991 | European Pat. Off. . |

OTHER PUBLICATIONS

Patent Abstracts of Japan, vol. 12, No. 400, (M-756)[3247], Oct. 24, 1988, & JP-A-63-145088, Jun. 17, 1988, H. Watanabe, "Sublimatable Thermal Transfer Dye Sheet".

*Primary Examiner*—Patrick J. Ryan
*Assistant Examiner*—William A. Krynski
*Attorney, Agent, or Firm*—Oblon, Spivak, McClelland, Maier & Neustadt

[57] ABSTRACT

A thermal transfer recording sheet comprising a base film, a heat transferable ink layer formed on one side of the base film and a heat resistant lubricating layer formed on the other side of the base film, wherein the heat resistant lubricating layer contains fine elastomer particles.

18 Claims, No Drawings

THERMAL TRANSFER RECORDING SHEET

The present invention relates to a thermal transfer recording sheet. Particularly, it relates to a thermal transfer recording sheet which is advantageously useful for color recording of television images or for color recording by terminals of office equipments such as facsimile machines, printers or copying machines.

In the thermal sensitive transfer recording system, an image-receiving sheet is overlaid on the ink-coated side of a thermal transfer recording sheet having a colorant-containing ink coated thereon, and recording is conducted by heating the rear side of the thermal transfer recording sheet by a thermal head so that the colorant in the thermal transfer recording sheet is thereby transferred to the image-receiving sheet. Such a system includes a wax transfer recording system using a heat-meltable ink and a dye transfer recording system using a sublimable dye-containing ink.

In a thermal sensitive transfer recording system of this type, the thermal transfer recording sheet is heated to a high temperature by a thermal head. If the heat resistance of the base film of the thermal transfer recording sheet is inadequate, the base film is likely to fuse and stick to the thermal head. By such fusion, running of the thermal head will be inferior, and sticking, or wrinkling or rupture of the sheet is likely to occur, whereby proper recording will no longer be possible. Therefore, it has been proposed to provide protective films of various heat resistant resins in order to improve the heat resistance of the base film (Japanese Unexamined Patent Publications No. 7467/1980 and No. 74195/1982), or to add heat resistant fine particles, lubricants or surfactants to such protective layers in order to further improve the running properties (Japanese Unexamined Patent Publications No. 146790/1980, No. 155794/1981, No. 129789/1982 and No. 145088/1988).

For improving the running properties, it is known to add various inorganic or organic particles to the heat resistant lubricating layer so as to roughen the surface of the heat resistant lubricating layer and thereby to reduce the friction coefficient with the head. However, with the fine particles heretofore proposed, sticking is still likely to result, and the contact with the thermal head is not satisfactory, whereby no adequate running properties have been obtained.

The present inventors have conducted extensive studies with an aim to obtain a better heat resistant lubricating layer for a thermal transfer recording sheet, and as a result, have found it possible to obtain a thermal transfer recording sheet substantially free from sticking and excellent in the running properties by incorporating fine particles of a certain specific material in the heat resistant lubricating layer. The present invention has been accomplished on the basis of this discovery.

Namely, it is an object of the present invention to provide a thermal transfer recording sheet which is free from sticking, provides smooth contact with the thermal head and has adequate running properties.

Thus, such an object of the present invention can be accomplished by providing a thermal transfer recording sheet comprising a base film, a heat transferable ink layer formed on one side of the base film and a heat resistant lubricating layer formed on the other side of the base film, wherein the heat resistant lubricating layer contains fine elastomer particles.

Now, the present invention will be described in detail with reference to the preferred embodiments.

A rubber having elasticity and heat resistance can be used as the fine elastomer particles in the present invention. A rubber durable at a temperature of 200° C., e.g. a silicone rubber such as dimethylsilicone or fluorosilicone, a fluorine rubber or an acryl rubber, is preferred. Particularly preferred is a silicone rubber elastomer commonly known as silicone-gel. This is a silicone which is composed essentially of an organopolysiloxane and which has been crosslinked to partially form a three dimensional network structure and which thus shows a deformation and limited fluidity upon application of a stress.

The following methods may, for example, be mentioned as methods for producing the fine elastomer particles employing such a silicone rubber.

(1) A liquid addition-reaction curable silicone rubber composition is prepared which comprises an organopolysiloxane containing at least two alkenyl groups such as vinyl groups, per molecule, an organohydrogen polysiloxane containing at least two hydrogen atoms bonded to a silicone atom, per molecule and a platinum compound catalyst. Then, the composition is put in water itself or water containing a surfactant, followed by stirring to obtain an aqueous dispersion having the liquid silicone rubber composition dispersed in a fine particle state. Then, the aqueous dispersion is sprayed in hot air to cure the liquid silicone rubber composition, or the dispersion is dispersed in water heated to a temperature of at least 25° C. to cure the liquid silicone rubber composition in the form of particles.

(2) Otherwise, a liquid condensation-reaction curable silicone rubber composition is prepared which comprises an organopolysiloxane containing at least two hydroxyl groups at both terminals of the molecular chain, an organohydrogen polysiloxane containing at least two hydrogen atoms bonded to a silicone atom, per molecule and an organic tin catalyst. This composition is put in water itself or water containing a surfactant, followed by stirring to disperse the silicone rubber composition in the form of fine particles. Then, the aqueous dispersion is permitted to stand still for a long period of time, or heated, or sprayed in hot air to cure the liquid silicone rubber composition.

The average particle size of the fine elastomer particles in the present invention is preferably within a range of from 0.1 to 10 μm, more preferably from 0.5 to 5 μm. If the particle size is too small, no adequate effect for surface roughening can be attained. On the other hand, if it is too large, the thermal conductivity will be substantially hindered, whereby the sensitivity tends to be low, such being undesirable.

The elastic modulus of the fine elastomer particles to be used in the present invention, can not be measured by a commonly available method, since the elastomer is in fine particle form. However, the compressibility can be measured by a simplified method as described in the examples given hereinafter. Namely, the compressibility of a dry packed column of fine particles against a load is obtained by using a thermal mechanical measuring apparatus by a method as described in the Examples, and the compressibility is compared with cases of fine particles of other common resins. The numerical values thereby obtained are shown in Table 2. From such data, it is evident that the fine elastomer particles of the present invention are highly elastic as compared with fine particles of other reins. In the present invention, the compressibility of the fine elastomer particles is preferably from 1 to 50%, more preferably from 3 to 20%.

To form the heat resistant lubricating layer of the present invention, the above fine elastomer particles are mixed with a binder resin as described below.

As the binder resin, it is common to employ the one having high heat resistance. For example, a cellulose-type resin such as ethyl cellulose, hydroxyethyl cellulose or cellulose acetate, a vinyl-type resin such as polyvinyl alcohol, polyvinyl acetate or polyvinyl butyral, a radiation-curable or heat-curable resin such as polyester acrylate, epoxy acrylate or polyol acrylate, a phenoxy resin or a polycarbonate resin, may be mentioned.

The proportion of the fine elastomer particles to the binder resin is usually within a range of from 1 to 100% by weight, preferably from 5 to 30% by weight.

It is preferred to employ a conventional liquid lubricant in combination with the fine elastomer particles for the purpose of further improving the running properties of the heat resistant lubricating layer. Such a liquid lubricant includes, for example, various silicone oils, fluorine-type oils, mineral oils, waxes and phosphate-type surfactants. The proportion of the liquid lubricant to the binder resin, is usually within a range of from 0.2 to 5% by weight, preferably from 0.5 to 3% by weight.

Further, it is preferred to incorporate conventional inorganic or organic fine particles other than the fine elastomer particles, such as silica, alumina, titanium oxide or a phosphate, to improve the cleaning properties by preventing deposition of foreign matters on the thermal head.

To form the heat resistant lubricating layer on a substrate, it is common to apply the fine particles in the form of a coating solution, followed by drying.

To prepare such a coating solution, a suitable solvent, e.g. an aromatic solvent such as toluene or xylene, a ketone-type solvent such as methyl ethyl ketone, methyl isobutyl ketone or cyclohexanone, an ester-type solvent such as ethyl acetate or butyl acetate, an alcohol-type solvent such as isopropyl alcohol, butanol or methyl cellusolve, a halogen-type solvent such as methylene chloride, trichloroethylene or chlorobenzene, or an ether-type solvent such as dioxane or tetrahydrofuran, may be used. Various methods such as those employing a gravure coater, a reverse coater and an air doctor coater, as disclosed in e.g. "Coating Systems", editted by Yuji Harasaki and published by Maki Shoten (1979), may be employed for applying the above coating solution to form the heat resistant lubricating layer.

The thickness of the heat resistant lubricating layer to be formed on the base film, is usually from 0.1 to 10 μm, preferably from 0.3 to 5 μm. It is preferred that when the heat resistant lubricating layer of the present invention is formed, a part of the fine elastomer particles are protruded from the binder layer of the heat resistant lubricating layer.

The base film in the heat transfer sheet of the present invention may be a polyethylene terephthalate film, a polyamide film, a polyaramide film, a polyimide film, a polycarbonate film, a polyphenylene sulfide film, a polysulfone film, a cellophane film, a triacetate film or a polypropylene film. Among them, a polyethylene terephthalate film is preferred from the viewpoint of the mechanical strength, the dimensional stability, the heat resistance and the price. A biaxially stretched polyethylene terephthalate film is more preferred. The thickness of such a base film is preferably from 1 to 30 μm, more preferably from 2 to 10 μm.

The ink layer of the thermal transfer recording sheet of the present invention may be formed by a usual method. For example, in the case of the sublimation type thermal transfer recording sheet, a sublimable or heat diffusible dye and a heat resistant binder resin may be dissolved or dispersed in a suitable solvent to obtain an ink, and this ink is coated on the base film, followed by drying. In the case of the melting thermal transfer recording sheet, a coloring matter such as a pigment or a dye is dissolved or dispersed in a heat-meltable substance, if necessary, by means of a solvent, to obtain an ink, and this ink is coated on the base film, followed by drying.

As the sublimable or heat diffusible dye to be used for the above sublimation type thermal transfer recording sheet, non-ionic dyes such as azo dyes, anthraquinone dyes, nitro dyes, styryl dyes, naphthoquinone dyes, quinophthalone dyes, azomethine dyes, cumalin dyes or condensed polycyclic dyes may be mentioned. As the binder resin, a polycarbonate resin, a polysulfone resin, a polyvinylbutyral resin, a phenoxy resin, a polyarylate resin, a polyamide resin, a polyaramide resin, a polyimide resin, a polyetherimide resin, a polyester resin, an acrylonitrile-styrene resin as well as cellulose resins such as acetyl cellulose, methyl cellulose and ethyl cellulose, may, for example, be mentioned. As the solvent, an organic solvent such as toluene or xylene, a ketone solvent such as methyl ethyl ketone, methyl isobutyl ketone or cyclohexanone, an ester solvent such as ethyl acetate or butyl acetate, an alcohol solvent such as isopropanol, butanol or methyl cellosolve, an ether solvent such as dioxane or tetrahydrofuran, or an amide solvent such as dimethylformamide or N-methylpyrrolidone, may be employed.

As the colorant to be used for the melting type thermal transfer recording sheet, the pigment includes, for example, an inorganic pigment such as carbon black, and various organic pigments of azo type or condensed polycyclic type, and the dye includes, for example, acidic, basic dyes, metal complex dyes and oil soluble dyes. Further, as the heat-meltable substance, a solid or semi-solid substance having a melting point of from 40° to 120° C. is preferred, such as paraffin wax, microcrystalline wax, carnauba wax, montan wax, Japan wax or fat-type synthetic wax. As the solvent, those mentioned above with respect to the sublimation type thermal transfer recording sheet, may be employed.

To the above described various inks, in addition to the above described components, various additives such as organic or inorganic non-sublimable fine particles, dispersants, antistatic agents, blocking-preventing agents, defoaming agents, antioxidants and viscosity controlling agents, may be incorporated, as the case requires.

Coating of such an ink may be conducted by the same methods as described above with respect to the coating of the heat resistant lubricating layer. The thickness of the coated film is preferably from 0.1 to 5 μm as the dried film thickness.

Further, in the production of the recording sheet of the present invention, corona treatment may be applied to the surface of the base film in order to improve the adhesion of the base film and the layers formed thereon as described above, or primer coating treatment may be conducted by means of a resin such as a polyester resin, a cellulose resin, a polyvinyl alcohol, a urethane resin or a polyvinylidene chloride.

The thermal transfer recording sheet of the present invention provides a smooth contact with a thermal head, is free from sticking or wrinkles and shows excellent running properties, since the surface roughening of the heat resistant lubricating layer is accomplished by flexible fine particles having rubber elasticity. Further, the transfer recording density is high. Furthermore, the running properties and the transfer recording density after storage under a high temperature and high humidity condition, are also excellent.

Now, the present invention will be described in further detail with reference to Examples. However, it should be understood that the present invention is by no means restricted by such specific Examples. In these Examples, "parts" means "parts by weight".

EXAMPLE 1

(a) Preparation of a Thermal Transfer Recording Sheet

Using a biaxially stretched polyethylene terephthalate film (thickness: 4.5 μm) as a base film, a coating solution having the composition as shown in the following Table 1 was coated in a wet film thickness of about 12 μm on one side of the film, then dried and treated by a high pressure mercury lamp with an energy of 120 W/cm with a distance between the mercury lamp and the film being 115 mm under an irradiation energy of 120 mJ/cm$^2$ for a curing reaction to form a heat resistant lubricating layer.

TABLE 1

| Name of compounds | Tradenames | Parts |
|---|---|---|
| Dipentaerythritol hexaacrylate type compound | KAYARAD DPHA, manufactured by Nippon Kayaku K.K. | 1.2 |
| Epoxy acrylate type compound | RIPOXY SP-1509, manufactured by Showa Kobunshi K.K. | 2.8 |
| Fine silicone rubber elastomer particles | Torefil E-730S, manufactured by Toray Silicone K.K. | 0.4 |
| Amino-modified silicone oil | KF-393, manufactured by Shin-Etsu Kagaku Kogyo K.K.) | 0.1 |
| Polymerization initiator | Darocur 1173, manufactured by Merck Co. | 0.2 |
| Ethyl acetate | | 30 |
| Isopropyl alcohol | | 15 |

On the back side of the heat resistant lubricating layer of the above film, an ink comprising 5 parts of a sublimable dye (C.I. Solvent Blue 95), 10 parts of a polysulfone resin and 85 parts of chlorobenzene, was coated and dried to form an ink layer having a thickness of about 1 μm, to obtain a thermal transfer recording sheet.

(b) Preparation of an Image-Receiving Sheet

A liquid comprising 10 parts of a saturated polyester resin ("TR-220", tradename, manufactured by Nippon Gosei K. K.), 0.5 part of an amino-modified silicone ("KF-393", tradename, manufactured by Shin-Etsu Kagaku Kogyo K. K.), 15 parts of methyl ethyl ketone and 15 parts of xylene, was coated on a synthetic paper ("YUPO FPG 150", tradename, manufactured by Oji Yuka K. K.) by a wire bar, then dried (dried film thickness: about 5 μm) and further subjected to heat treatment in an oven at 100° C. for 30 minutes to obtain an image-receiving sheet.

(c-1) Results of the Transfer Recording (Running Properties, Wrinkles)

The recording sheet and the image-receiving sheet prepared as described above, were put together so that the ink layer of the recording sheet was in contact with the resin-coated side of the image-receiving sheet, and an electric power of 0.4 W/dot was applied to the heat resistant layer side of the recording sheet for 10 msec by a partially glazed line thermal head having a heat generating resistor density of 8 dot/mm to conduct transfer recording of 200 mm at a density of 8 lines/mm.

The results are shown in Table 2.

(c-2) Results of the Transfer Recording (Transfer Densities)

Using a partially glazed line thermal head having a heat generating resistor density of 6 dot/mm, recording was conducted under the following conditions instead of the transfer recording conditions in the above item (c-1), and the color densities of the recorded products thereby obtained are shown in Table 2.

| | |
|---|---|
| Recorded line density | 6 lines/mm |
| Electric power applied to the thermal head | 0.30 W |
| Pulse width applied to the thermal head | 6 msec |

(d) Results of Evaluation of the Storage Stability

The recording sheet was wound on a paper tube of 1 inch and held for 2 weeks in an environment at a temperature of 60° C. under a relative humidity of 60%. Then, a transfer recording test was conducted in the same manner as above, and the presence or absence of a deterioration of the performance due to the migration of the silicone oil to the ink layer was determined.

The results are shown in Table 2.

EXAMPLES 2 and 3 and COMPARATIVE EXAMPLES 1 to 4

Thermal transfer recording sheets were prepared in the same manner as in Example 1 except that fine particles and their amounts as identified in Table 2 were used instead of the fine silicone rubber elastomer particles in Table 1 in a coating solution for the heat resistant lubricating layer for the thermal transfer recording sheet, and the sheets were evaluated in the same manner.

The results are shown in Table 2.

TABLE 2

| | Fine particles | | | | | Transfer recording | | | StoRage stability | | |
|---|---|---|---|---|---|---|---|---|---|---|---|
| | Type | Average particle size (μm) | Tradename Manufacturers | Compressibility* (%) | Amount (to the resin) (wt %) | Record densities | Running properties | Wrinkles | Record densities | Running properties | Wrinkles |
| Example 1 | Silicone rubber elastomer | 1.5 | Torefil E-730S (*1) | 4.4 | 10 | 1.86 | Good | Nil | 1.86 | Good | Nil |
| Example 2 | Silicone rubber elastomer | 1.5 | Torefil E-730S (*1) | 4.4 | 30 | 1.81 | Good | Nil | 1.80 | Good | Nil |
| Example | Silicone | 3.0 | Torefil | 5.0 | 10 | 1.78 | Good | Nil | 1.79 | Good | Nil |

TABLE 2-continued

| | Fine particles | | | | | Transfer recording | | | StoRage stability | | |
|---|---|---|---|---|---|---|---|---|---|---|---|
| | Type | Average particle size (μm) | Tradename Manufacturers | Compressibility* (%) | Amount (to the resin) (wt %) | Record densities | Running properties | Wrinkles | Record densities | Running properties | Wrinkles |
| 3 | rubber elastomer | | E-500 (*1) | | | | | | | | |
| Comparative Example 1 | Silicone resin powder | 1.0 | Torefil R-930 (*1) | 0.5 | 10 | 1.70 | Sticking | Nil | 1.68 | Sticking | Nil |
| Comparative Example 2 | Silicone resin powder | 2.0 | Tospal 120 (*2) | 0.4 | 10 | 1.64 | Sticking | Nil | 1.61 | Sticking | Nil |
| Comparative Example 3 | Silica spherical particles | 1.0 | Siehoster KE-P100 (*3) | 0.3 | 10 | 1.67 | Sticking | Nil | 1.66 | Sticking | Formed |
| Comparative Example | Benzo-guanamine powder | 1.5 | Eposter M (*3) | 0.6 | 10 | 1.62 | Sticking | Nil | 1.60 | Sticking | Formed |

*Compressiblity: Using a thermal mechanical measuring apparatus (tradename: TMA-10, manufactured by Seiko Denshi Kogyo K.K.), a load of 30 g was exerted to a cylindrical sample with a surface area of 24 mm$^2$ and a height of 2 mm, whereby the compression displacement (mm) was measured, and the compressibility was calculated by the following formula: Compressibility (%) = compression displacement (mm) ÷ 2 (mm) × 100
(*1): Toray Silicone K.K.
(*2): Toshiba Silicone K.K.
(*3): Nihon Shokubai K.K.

EXAMPLE 4

A thermal transfer recording sheet was prepared in the same manner as in Example 1 except that for a coating solution for the heat resistant lubricating layer for a thermal transfer recording sheet, 0.4 part of Aerosil titan T-805 (manufactured by Nippon Aerosil K. K.) was added to the coating solution of Example 1 for the purpose of imparting cleaning properties, and the sheet was evaluated in the same manner, and at the same time the cleaning properties were evaluated. The results are shown in Table 3.

TABLE 3

| | Transfer recording | | | | Storage stability | | | |
|---|---|---|---|---|---|---|---|---|
| | Record densities | Cleaning properties *a | Running properties | Wrinkles | Record densities | Cleaning properties *a | Running properties | Wrinkles |
| Example 4 | 1.85 | ◎ | Good | Nil | 1.84 | ◎ | Good | Nil |
| Example 1 | 1.86 | ○ | Good | Nil | 1.86 | ○ | Good | Nil |

*a: ◎ = No abnormality was observed on the printed image surface.
○ = Cleaning properties are acceptable although scratch marks due to deposition of foreign matters on the head, were slightly observed on the printed image surface.

We claim:

1. A thermal transfer recording sheet comprising a base film, a heat transferable ink layer formed on one side of the base film and a heat resistant lubricating layer formed on the other side of the base film, wherein elastomer particles having an average particle size of from 0.1 to 10 μm are dispersed in the heat resistant lubricating layer.

2. The thermal transfer recording sheet according to claim 1, wherein the elastomer particles have a compressibility of from 1 to 50%.

3. The thermal transfer recording sheet according to claim 1, wherein the elastomer particles are silicone rubber elastomer particles.

4. The thermal transfer recording sheet according to claim 1, wherein the heat resistant lubricating layer comprises a binder resin and 1 to 100% by weight of the elastomer particles based on the weight of the binder resin.

5. The thermal transfer recording sheet according to claim 4, wherein the heat resistant lubricating layer further contains inorganic or organic fine particles other than the elastomer particles.

6. The thermal transfer recording sheet according to claim 4, wherein the heat resistant lubricating layer further contains from 0.2 to 5% by weight of liquid lubricant.

7. The thermal transfer recording sheet according to claim 6, wherein the liquid lubricant is at least one member selected from the group consisting of silicone oil, fluorinated oil, mineral oil, wax and a phosphate surfactant.

8. The thermal transfer recording sheet according to claim 1, wherein the heat resistant lubricating layer has a thickness of from 0.1 to 10 μm.

9. The thermal transfer recording sheet according to claim 1, wherein at least a part of the elastomer particles are protruded from the heat resistant lubricating layer.

10. The thermal transfer recording sheet according to claim 3, wherein the elastomer particles are silicon-gel particles.

11. The thermal transfer recording sheet according to claim 1, wherein said elastomer particles have an average particle size of from 0.5-5 μm.

12. The thermal transfer recording sheet according to claim 2, wherein the elastomer particles have a compressibility of from 3-20%.

13. The thermal transfer recording sheet according to claim 4, wherein the heat resistant lubricating layer comprises a binder resin and 5-30% by weight of elastomer particles based on the weight of the binder resin.

14. The thermal transfer recording sheet according to claim 5, wherein said inorganic or organic fine particles are selected from the group consisting of silica, alumina, titanium oxide and phosphate.

15. The thermal transfer recording sheet according to claim 6, wherein said heat resistant lubricating layer further contains from 0.5–3% by weight of liquid lubricant.

16. The thermal transfer recording sheet according to claim 1, wherein said base film is a biaxially stretched polyethylene terephthalate film.

17. The thermal transfer recording sheet according to claim 1, wherein said base film is from 1–30 μm thick.

18. The thermal transfer recording sheet according to claim 1, said base film is from 2–10 μm thick.

* * * * *